(12) United States Patent
Doerflinger et al.

(10) Patent No.: US 7,584,827 B2
(45) Date of Patent: Sep. 8, 2009

(54) MANUALLY ACTUATED BRAKE SYSTEM FOR MANUALLY TOWABLE VEHICLE

(75) Inventors: David A. Doerflinger, Racine, WI (US); Daniel Guptail, Racine, WI (US)

(73) Assignee: Snap-on Incorporated, Kenosha, WI (US)

( * ) Notice: Subject to any disclaimer, the term of this patent is extended or adjusted under 35 U.S.C. 154(b) by 236 days.

(21) Appl. No.: 11/521,226

(22) Filed: Sep. 14, 2006

(65) Prior Publication Data

US 2007/0007090 A1 Jan. 11, 2007

Related U.S. Application Data

(62) Division of application No. 10/825,443, filed on Apr. 15, 2004, now Pat. No. 7,124,859.

(60) Provisional application No. 60/465,323, filed on Apr. 25, 2003.

(51) Int. Cl.
*B62B 5/04* (2006.01)

(52) U.S. Cl. .................. 188/19; 74/492; 280/47.11; 280/47.34

(58) Field of Classification Search ............... 188/19, 188/21, 22; 280/47.34, 47.11; 74/492
See application file for complete search history.

(56) References Cited

U.S. PATENT DOCUMENTS

| | | | |
|---|---|---|---|
| 206,038 A * | 7/1878 | Phelps | .............. 280/47.11 |
| 1,135,097 A | 4/1915 | Buckwalter | |
| 1,632,175 A | 6/1927 | Coultes | |
| 1,862,778 A | 4/1932 | Holanbek | |
| 2,018,527 A | 10/1935 | Kerr | |
| 2,169,781 A | 8/1939 | Abresch | |
| 2,193,411 A | 3/1940 | Sheldon | |
| 2,530,886 A * | 11/1950 | Maisel | .............. 280/47.11 |
| 2,651,379 A | 9/1953 | Elliott et al. | |
| 2,687,912 A | 8/1954 | Beauchamp | |
| D182,877 S | 5/1958 | Cole | |
| 3,360,082 A | 12/1967 | Grubis | |
| 3,516,521 A | 6/1970 | Wolff | |
| 3,532,188 A | 10/1970 | Keiz | |
| 3,664,465 A | 5/1972 | Holland | |
| 4,550,931 A | 11/1985 | Ziaylek, Jr. | |
| 4,796,909 A | 1/1989 | Kirkendall | |
| 4,854,422 A * | 8/1989 | Kawada et al. | ............ 187/231 |
| 4,949,986 A | 8/1990 | Gohler | |
| 5,205,381 A | 4/1993 | Mehmen | |
| 5,249,823 A | 10/1993 | McCoy et al. | |
| 5,509,672 A | 4/1996 | Offerson | |
| 5,513,940 A * | 5/1996 | Florentin et al. | ............ 414/458 |
| 5,692,761 A | 12/1997 | Havlovitz | |
| 5,704,623 A * | 1/1998 | Chapman | ............. 280/47.11 |
| 5,722,515 A | 3/1998 | Wyse | |

(Continued)

*Primary Examiner*—Bradley T King
(74) *Attorney, Agent, or Firm*—Seyfarth Shaw LLP

(57) ABSTRACT

A brake system for a vehicle having a plurality of wheels and a frame comprising a mechanically actuated braking assembly operably coupled with at least one of the wheels and being operable between braking and non-braking conditions, a handle coupled to the braking assembly and being mounted to the frame for pivotal movement about a substantially horizontal axis between first and second positions in each of which the braking assembly is in the braking condition, and an actuating mechanism responsive to movement of the handle from either of the first and second positions for actuating the braking assembly into the non-braking condition.

19 Claims, 11 Drawing Sheets

U.S. PATENT DOCUMENTS

| | | |
|---|---|---|
| 5,791,669 A | 8/1998 | Broddon et al. |
| 5,868,407 A | 2/1999 | Roese |
| 5,876,047 A | 3/1999 | Dennis |
| 5,885,048 A | 3/1999 | Barth |
| 6,203,034 B1 | 3/2001 | Houry |
| 6,237,725 B1 | 5/2001 | Otterson et al. |
| 6,286,631 B1 | 9/2001 | Kimble |
| 6,339,732 B1 | 1/2002 | Phoon et al. |
| 6,398,276 B1 | 6/2002 | Smith |
| 6,409,187 B1 | 6/2002 | Crow, Jr. |
| D462,170 S | 9/2002 | Chen et al. |
| 6,508,479 B1 | 1/2003 | Tseng |
| 6,536,796 B1 | 3/2003 | Solomon |

* cited by examiner

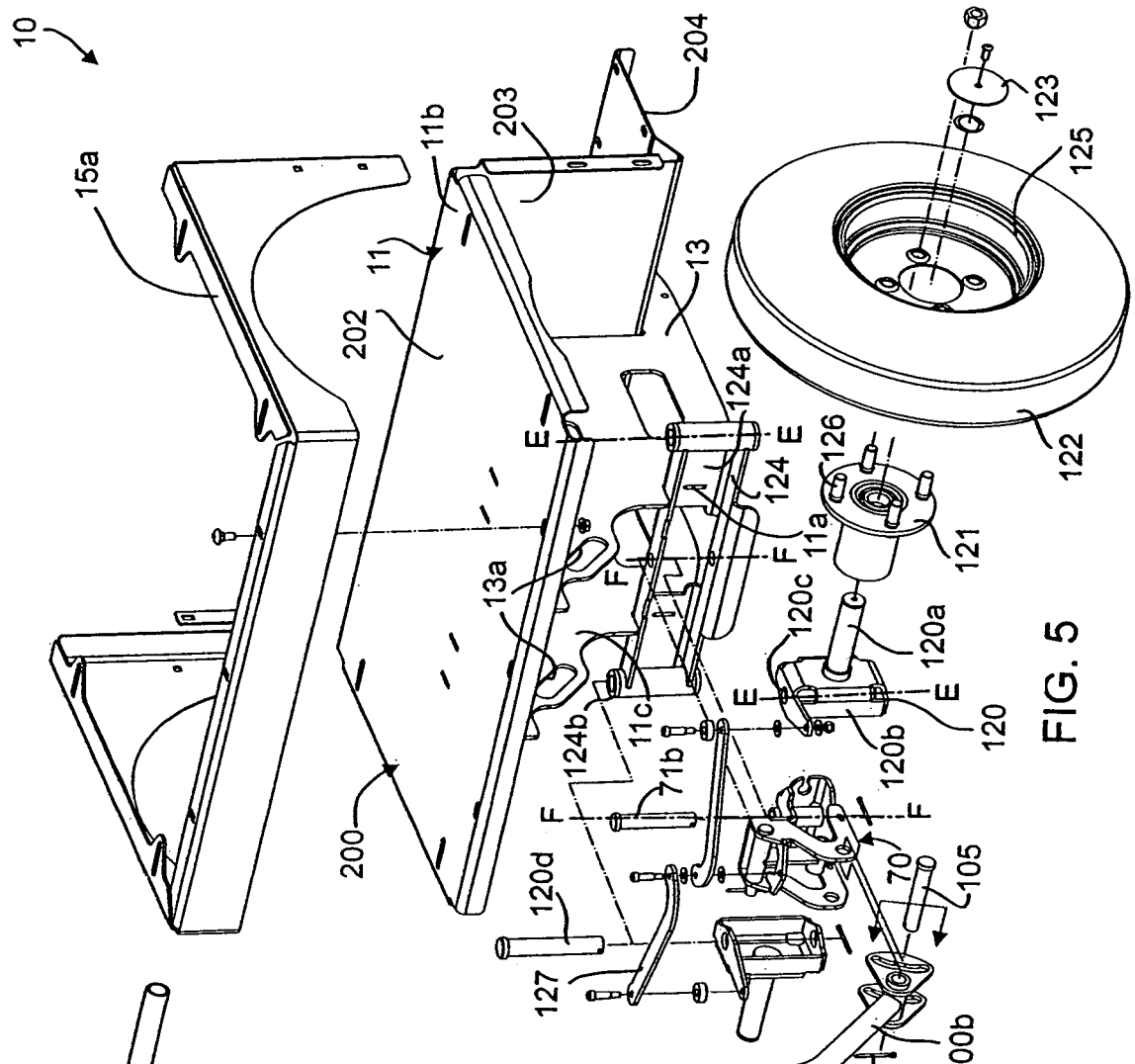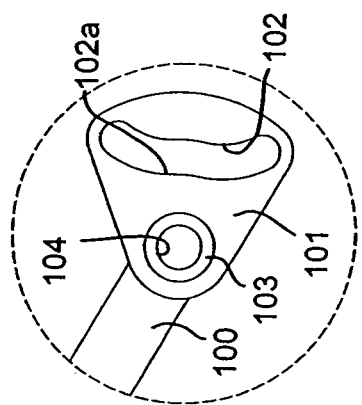

MANUALLY ACTUATED BRAKE SYSTEM FOR MANUALLY TOWABLE VEHICLE

REFERENCE TO RELATED APPLICATIONS

This application is a division of U.S. application Ser. No. 10/825,443, filed Apr. 15, 2004 now U.S. Pat. No. 7,124,859.

CROSS REFERENCE TO RELATED APPLICATION

The present application claims the benefit of the filing date of U.S. Provisional Application No. 60/465,323, filed Apr. 25, 2003.

BACKGROUND OF THE INVENTION

The present application relates generally to brake systems for hand operated vehicles and more particularly to mechanically actuated brake systems for hand operated wheeled vehicles.

Hand operated tool "trailers" are wheeled vehicles including a large, heavy and cumbersome item, such as a tool cabinet or chest, with wheels and a towing handle attached. Thus, such trailers typically require some type of reliable braking system. This is typically accomplished by disposing a handle at the front end of the trailer that is used for pushing, pulling and steering the trailer, and placing a hand operated braking lever adjacent to the handle that is operatively coupled to a braking mechanism associated with at least one of the wheels. The lever is typically actuated by a user's hand, thus activating the braking mechanism. Releasing the lever causes the braking mechanism to release the brake, thus facilitating trailer mobility.

However, due to these trailers' large size and heavy mass, the force necessary to apply sufficient braking resistance may be great, and generally much greater than can be supplied by a typical user's manual force exertion upon the lever. As such, these braking mechanisms are generally hydraulically assisted, thus allowing a user to apply minimal manual force to the braking lever which is proportionally multiplied to the braking mechanism by hydraulic mechanics. A limitation of such a braking mechanism is that such hydraulic assistance requires a complex and costly sub-assembly of hydraulic actuators, piping, fluid, and the like, all of which require frequent maintenance. Further, such a hydraulically assisted mechanism does not provide any safety mechanisms if, for example, the trailer runs out of control while descending a ramp or while the trailer is stowed.

SUMMARY OF THE INVENTION

The present application discloses a mechanically operated braking system for a hand maneuverable tool trailer that allows the user to selectively apply a mechanical brake by varying the vertical pivotal orientation of the trailer's forwardly disposed handle and which further automatically applies the brakes during emergency or storage conditions.

A mechanical braking assembly is provided that includes a brake caliper having two brake pads sandwichingly disposed about a brake rotor adjacent to and operably coupled with at least one of the rear wheels. The pads are disposed into frictional engagement with the rotor by a brake actuation lever that is coupled to the outside surface of one of the pads, which is biased by an adjustable biasing mechanism to a braking condition applying the brakes.

A brake control cable is disposed along the length of the trailer with one terminus adjacent to the brake assembly and coupled to the brake actuation lever, and the opposite terminus coupled to cam plates integrally disposed with the pivotal handle. The handle is pivotally coupled to the front end of the trailer and can pivot from first and second positions, relative to the trailer, via a handle swivel assembly, whereby the vertical pivotal orientation controls brake application and the horizontal pivotal orientation controls steering. Movement from either the first or second position causes the brake assembly to be released, thus facilitating movement of the trailer. A camming structure disposed in the cam plates selectively applies a generally forwardly directed pulling force to the cable based upon the relative vertical pivotal orientation of the handle, thus causing the braking assembly to release the brakes. Due to the handle's pivotal lever design, minimal user force is required at the distal end of the handle to dispose the handle in the necessary inclined angle, relative to the trailer, to release the brakes. The handle also ensures that if the handle is in a substantially vertical orientation, such as when the trailer is stowed, or in a substantially horizontal position, such as when the handle is dropped, the brakes are immediately applied, thus providing requisite braking safety.

BRIEF DESCRIPTION OF THE DRAWINGS

For the purpose of facilitating an understanding of the subject matter sought to be protected, there is illustrated in the accompanying drawing an embodiment thereof, from an inspection of which, when considered in connection with the following description, the subject matter sought to be protected, its construction and operation, and many of its advantages, should be readily understood and appreciated.

FIG. 5 is a partial, exploded, perspective view of the front end of the tool trailer of FIG. 1 with a majority of the components in a disassembled condition to illustrate placement;

FIG. 6 is an enlarged, side elevation view of the cam plates of the handle of FIG. 5;

DETAILED DESCRIPTION

The present application discloses a manually operated mechanical braking apparatus and method for a hand maneuverable wheeled vehicle, such as a tool carrying and storage trailer, which is easily operated by manual manipulation of the orientation of a vertically pivotal handle disposed on the front end of the trailer. While a tool carrying and storage trailer is depicted in the figures, it will be appreciated that the invention described herein can be used with any type of hand operated vehicle and that the depiction of a tool trailer is used for illustrative purposes only.

Figure 1:
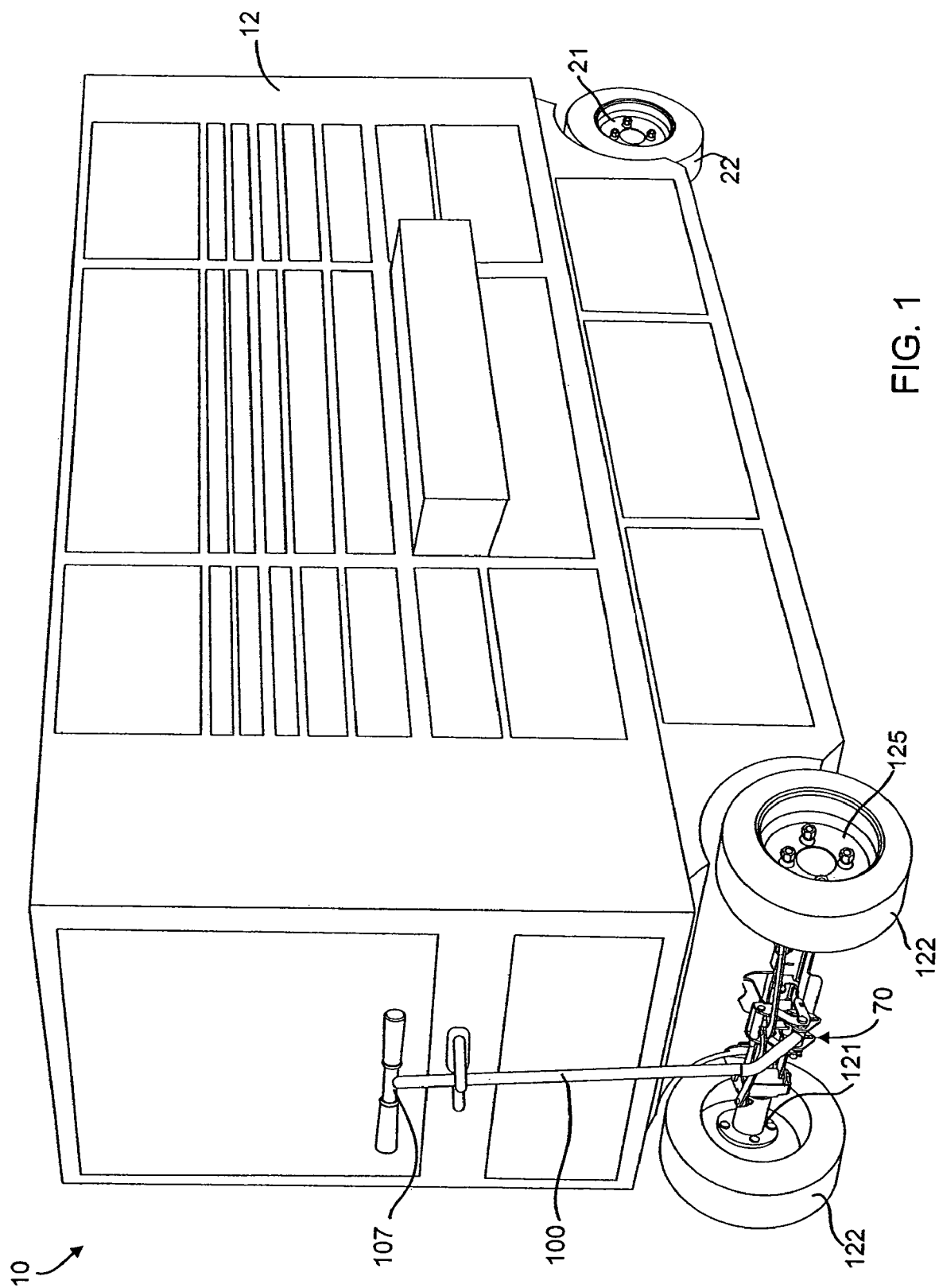
FIG. 1 is a front perspective view of a typical tool trailer intended to incorporate the braking system of the present application.
Figure 1A:
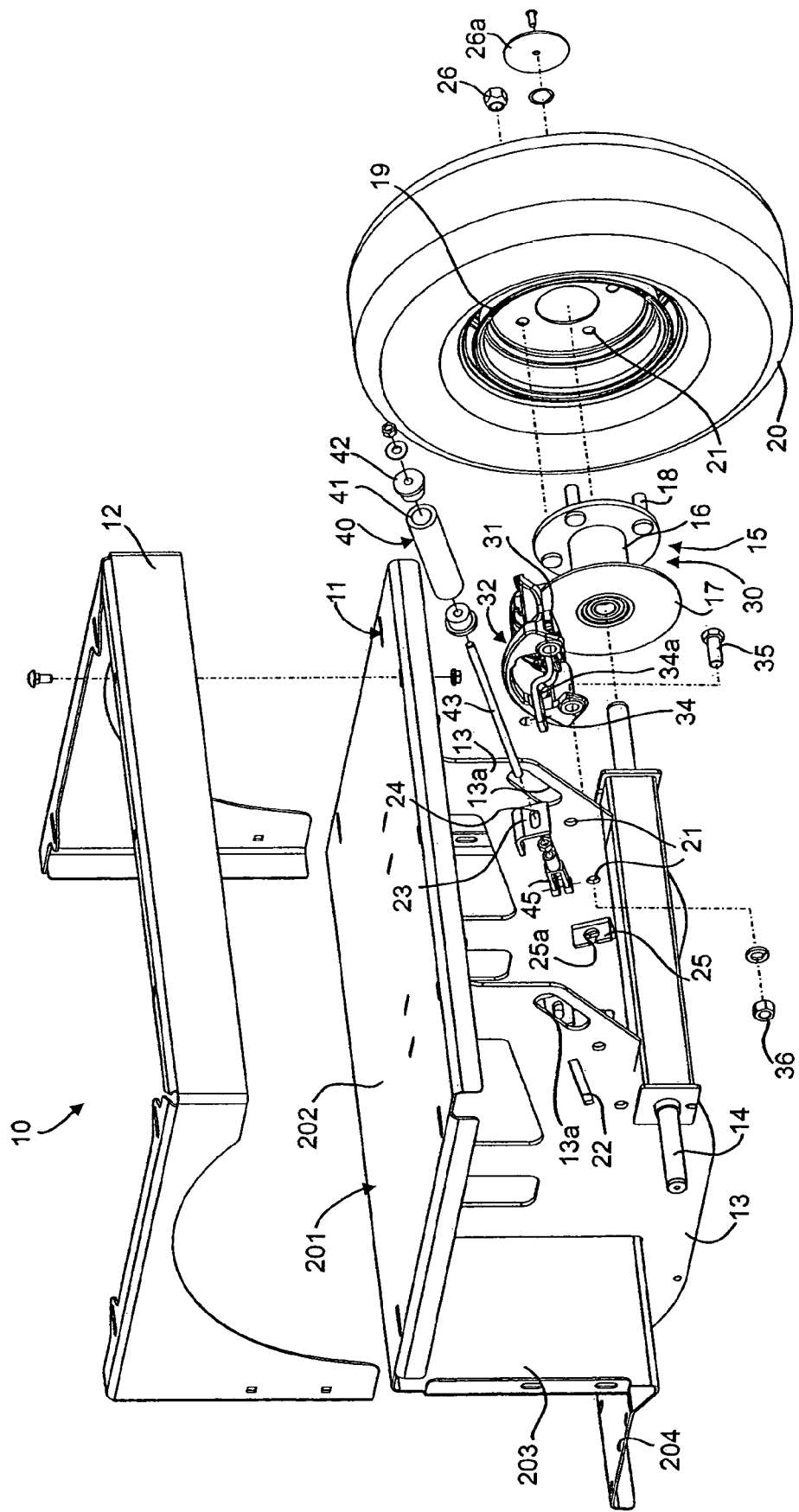
FIG. 1A is an enlarged, partial, exploded, perspective view of the rear end of the tool trailer of FIG. 1 incorporating the braking system of the present application depicting a majority of the components in a disassembled condition to illustrate relative placement.

Referring to FIGS. 1 and 1a, a tool storage trailer 10 is shown including a body 12 and a frame 11 supporting a transversely disposed rear axle 14. A wheel hub 15 having a cylindrical body 16 adapted for rotatably receiving therein an end of the axle 14 includes a braking assembly 30 having an annular brake rotor 17 sandwichingly disposed between inner and outer brake pads 31 that are operably coupled to a brake caliper assembly 32 and having a brake rotor surface adapted for frictional engagement with the respective inner surfaces of the inner and outer brake pads. The wheel hub 15 may include a flange carrying a plurality of outwardly extending wheel studs 18 adapted to mate with complementary apertures 21 disposed on a wheel rim 19 supporting a tire 20. The wheel rim 19 may be secured to the wheel hub studs 18 with complementary fasteners 26, for example lug nuts. In an embodiment, the brake rotor 17 is longitudinally spaced from the wheel hub 15 by the cylindrical body 16 and is disposed inwardly relative to the frame 11.

The braking assembly 30 is adapted to move between a braking condition, wherein the respective inner surfaces of the brake pads 31 frictionally engage the brake rotor 17 surface when braking resistance is desired, and a non-braking condition, wherein the pads 31 are adapted to be in spaced, non-engaging relationship with the brake rotor 17 surface when braking resistance is not desired. A brake actuation lever 34 is pivotally mounted to the brake caliper assembly 31 frame adjacent to the inner brake pad 31, thereby defining a fulcrum, and is disposed with a proximal end in substantial abutting relationship with the outer surface of the inner brake pad 31. The opposite, distal end of the brake actuation lever 34 includes a substantially centrally disposed lever aperture 34a. As such, the distal and proximal ends pivot forwardly and rearwardly relative to the fulcrum and reciprocally relative to each other. The braking condition is thus achieved when the distal end of the lever 34 is disposed rearwardly relative to the fulcrum, thus causing the proximal end of the lever 34 to actuate forwardly and coact with the exterior surface of the inner brake pad 31 to move the inner surface of the brake pad 31 into frictional engagement with the brake rotor 17.

At least two brake caliper mounting apertures 21 are provided on the adjacent sidewall 13 of the frame 11 and are disposed in axial alignment with respective caliper mounting bolts 35 received in caliper apertures on the brake caliper assembly 32 for fixedly mounting the caliper 32 to the frame 11. The frame 11 may include a substantially inclined, oblong aperture 22 (FIG. 3) disposed on the sidewall 13 to receive therethrough the distal end of the brake actuation lever 34, thus causing the distal end of the lever 34 to extend substantially inwardly relative to the frame 11 and be disposed on the inside of the sidewall 13.

A brake assembly bracket 23 having a substantially centrally disposed oblong aperture 24 is integrally coupled to the sidewall 13 adjacent to the oblong aperture 22 and on the inside of the sidewall 13 relative to the frame 11. A cable mount bracket 25 having a substantially centrally disposed aperture 25a adapted to support a brake control cable 50, as discussed below, is also integrally coupled to the inside of the sidewall 13 and disposed substantially forwardly of and below the brake assembly bracket 23 thereby defining a substantially inclined relation between the cable mount bracket 25 and brake assembly bracket 23. Both the brake assembly bracket 23 and cable mount bracket 25 are integral with the sidewall 13 and may be welded or otherwise secured thereto in a well known manner.

Upon assembly, the wheel hub 15 is disposed onto the axle 14 so that the wheel hub 15 is rotatable about the longitudinal axis of the axle 14 and wherein the brake rotor 17 is disposed between the frame 11 and cylindrical body 16. The brake caliper assembly 32 is mounted to the frame 11 by disposing the caliper bolts 35 thru the caliper apertures and caliper mounting apertures 21 so that the distal end of the brake actuation lever 34 is disposed inwardly relative to the sidewall 13, thru the oblong aperture 22 (FIG. 3) and between the brake assembly bracket 23 and the cable mount bracket 25. A complementary caliper bolt nut 36 may be threaded onto the caliper bolt 35 to fixedly couple the brake caliper assembly 31 to the frame 11. The wheel hub 15 is coupled to the axle 14 when the wheel rim 19 is secured to the wheel hub 15 by axially aligning the wheel hub studs 18 with the wheel rim stud apertures 21 and securing the wheel rim 19 onto the wheel hub 15 with fasteners 26 and securing an axle cap 26a onto the axle 14 from the outside of the wheel rim 19.

Figure 2:
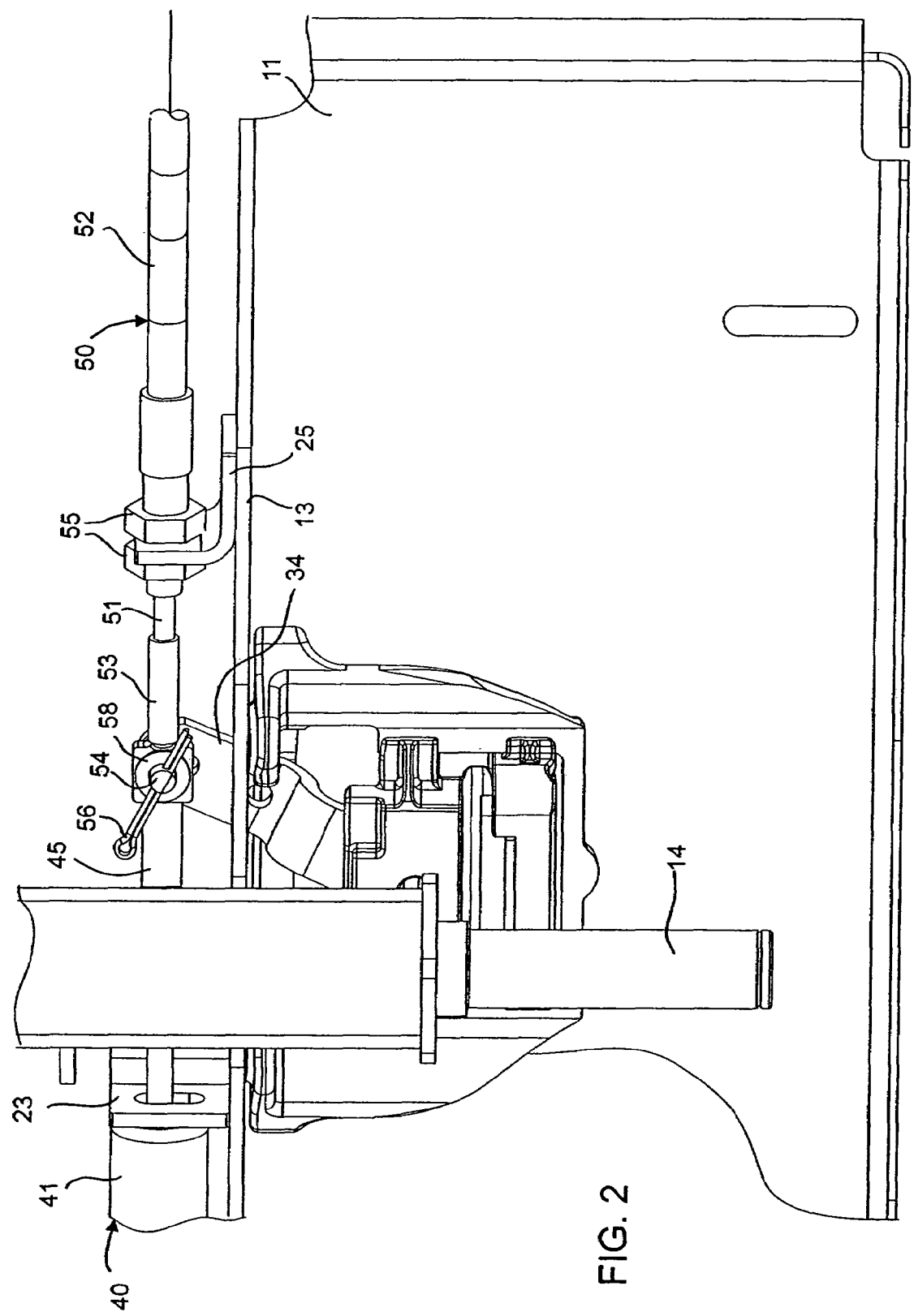
FIG. 2 is a further enlarged, fragmentary bottom view of the biasing mechanism of FIG. 1A in an assembled condition.
Figure 3:
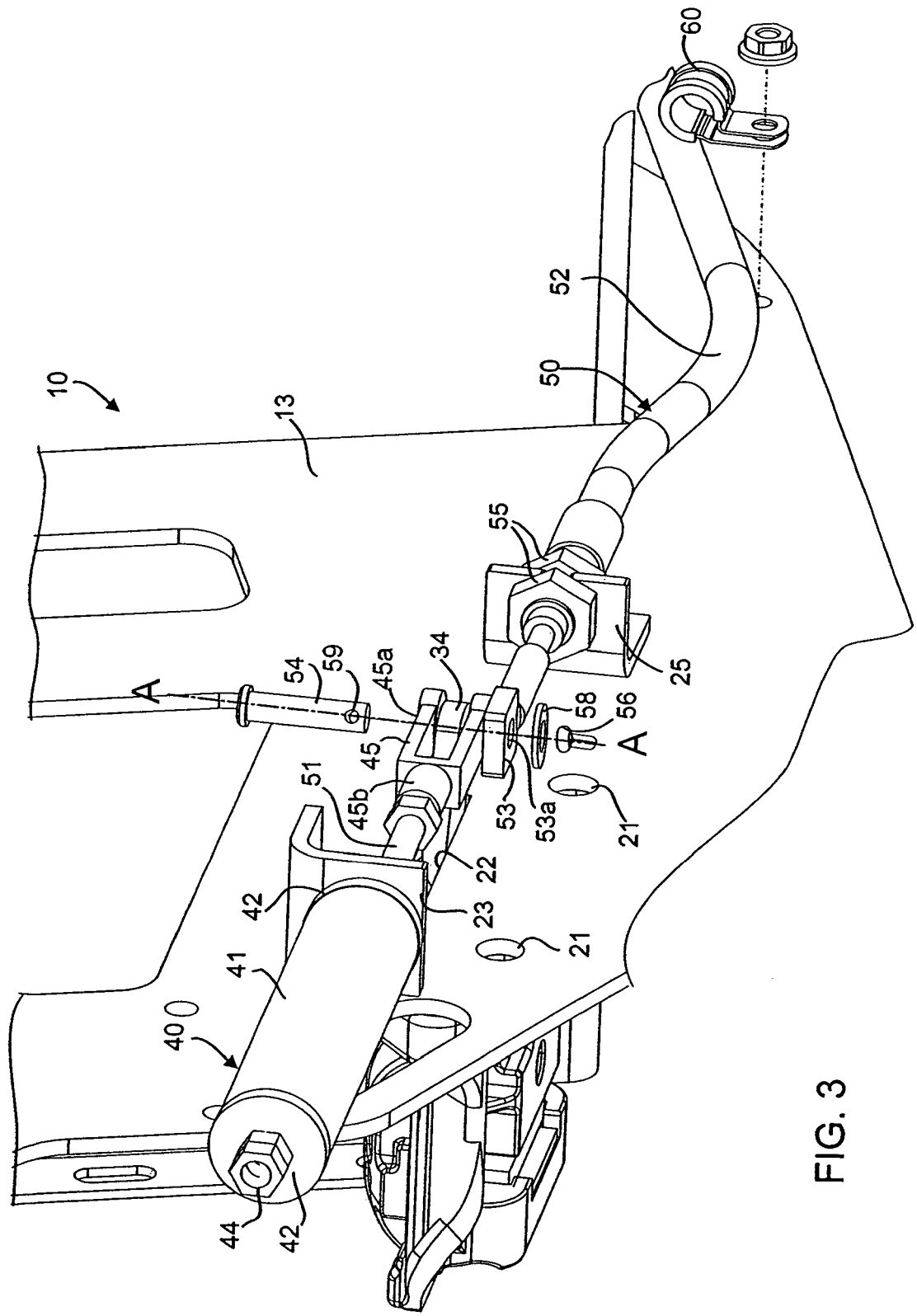
FIG. 3 is a fragmentary, perspective partially exploded view of the biasing mechanism of FIG. 2.
Figure 4:
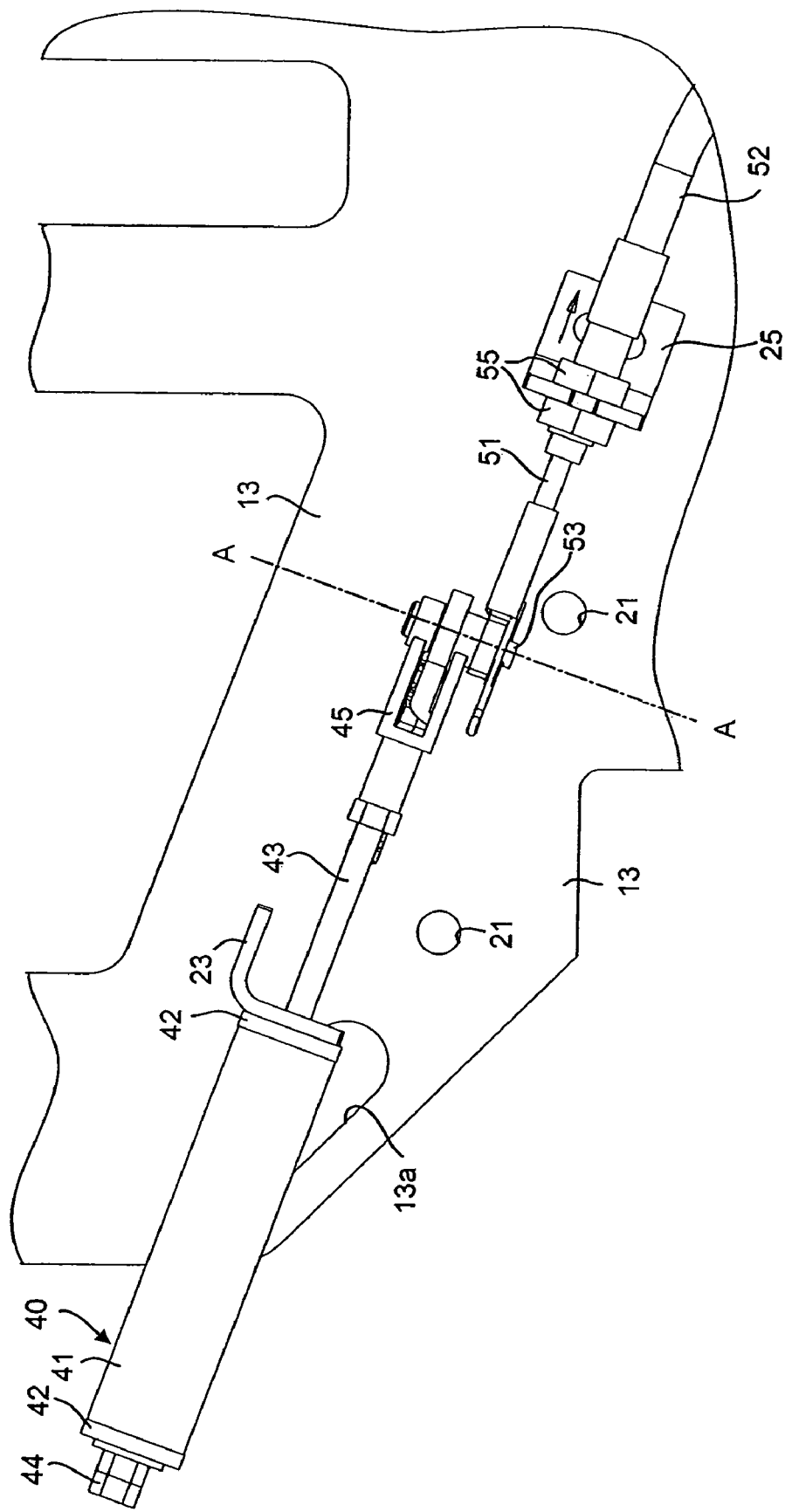
FIG. 4 is a fragmentary, side elevation view of the biasing mechanism of FIG. 2.

Referring also to FIGS. 2-4, a biasing mechanism 40 is provided for actuating the brake actuation lever 34, thus biasing the lever 34 to cause the brake pads 32 to be disposed in frictional engagement with the brake rotor, thus causing the braking assembly 30 to move into the braking condition. The biasing mechanism 40 includes a generally Y-shaped yoke 45 having two-spaced apart arms 45a converging to a shared leg 45b. Each arm 45a has an aperture axially aligned along an axis A (FIG. 3). The yoke 45 is disposed between the brake assembly bracket 23 and the cable mount bracket 25 and is positioned so that the yoke arms 45a sandwich the distal end of the brake actuation lever 34 and the yoke arm apertures are axially aligned with the brake actuation lever aperture 34a. The leg 45b of the yoke 45 is threadably coupled to an elongated rod 43 having complementary threads and that extends at a substantially upwardly inclined angle relative to the sidewall 13 and through the brake assembly bracket aperture 24, thus extending substantially outwardly relative to the frame 11.

A biasing structure 41, which may include a compression spring, is circumferentially disposed around the rod 43 with a terminal end disposed in abutting relationship with the brake assembly bracket 23 and the opposing end coupled to the rod 43. Either one or both ends of the biasing structure 41 may include a centralizing cap 42 to centralize the rod 43 within the biasing structure 41. The biasing structure 41 is coupled to the rod 43 via a nut 44 having complementary threads and threaded onto a distal end of the rod 43.

A brake control cable 50 including a cable sheathing 52 and an internally slideable cable 51 is coupled to the cable mount bracket 25 by being disposed thru the cable mount bracket aperture 25a and fixedly secured to the cable mount bracket 25 via coupling nuts 55 disposed on opposing sides of the cable mount bracket 25, thus allowing the cable 51 to extend outwardly and slide relative to the cable mount bracket 25. The terminus of the cable 51 includes a ring-type cable connector 53. The connector 53 aperture is disposed in axial alignment along axis A and with the yoke arm apertures and the brake actuation lever aperture 34a, wherein a slideably disposed cable pin 54 couples the yoke 45, brake actuation lever 34 and connector 53 to each other. A cotter pin 56 and washer 58 may be used in conjunction with an aperture extending through the cable pin 53 to securely couple the pin 53 and the yoke 45, lever 34 and connector 53. The coupling nuts 55 further provide a means for adjusting the relative placement of the connector 53, thereby adjusting the range of braking resistance.

A plurality of cable holds 60 (one shown in FIG. 3) may couple the cable housing 52 to the frame 11 thereby securing the cable 50 to the frame 11 where the cable 50 is adjacent to the frame 11.

The biasing structure 41 causes a generally outwardly directed force, relative to the frame 11, to be applied to the yoke 45, thus causing the brake actuation lever 34 to move the brake pads 31 into the braking condition and cause application of the brakes. Transmitting a generally forwardly directed force to the cable 51 causes the brake pads 31 to be moved to the non-braking condition wherein the brake actuation lever 34 allows the brake pad 31 to disengage the brake rotor 17. Further, such a forwardly directed force causes the biasing structure 41 to compress toward the brake assembly bracket 23 and collect potential energy whereupon releasing the forwardly directed force on the cable 51 allows the biasing structure 41 to bias the brake pads 31 to the braking condition.

It will be appreciated that while only one wheel assembly has been illustrated in the figures, a transversely opposing wheel assembly mounted on the opposite end of the axle 14 relative to the frame 11, has substantially the same configuration and may or may not include the braking assembly 30 as described above.

Figure 7:
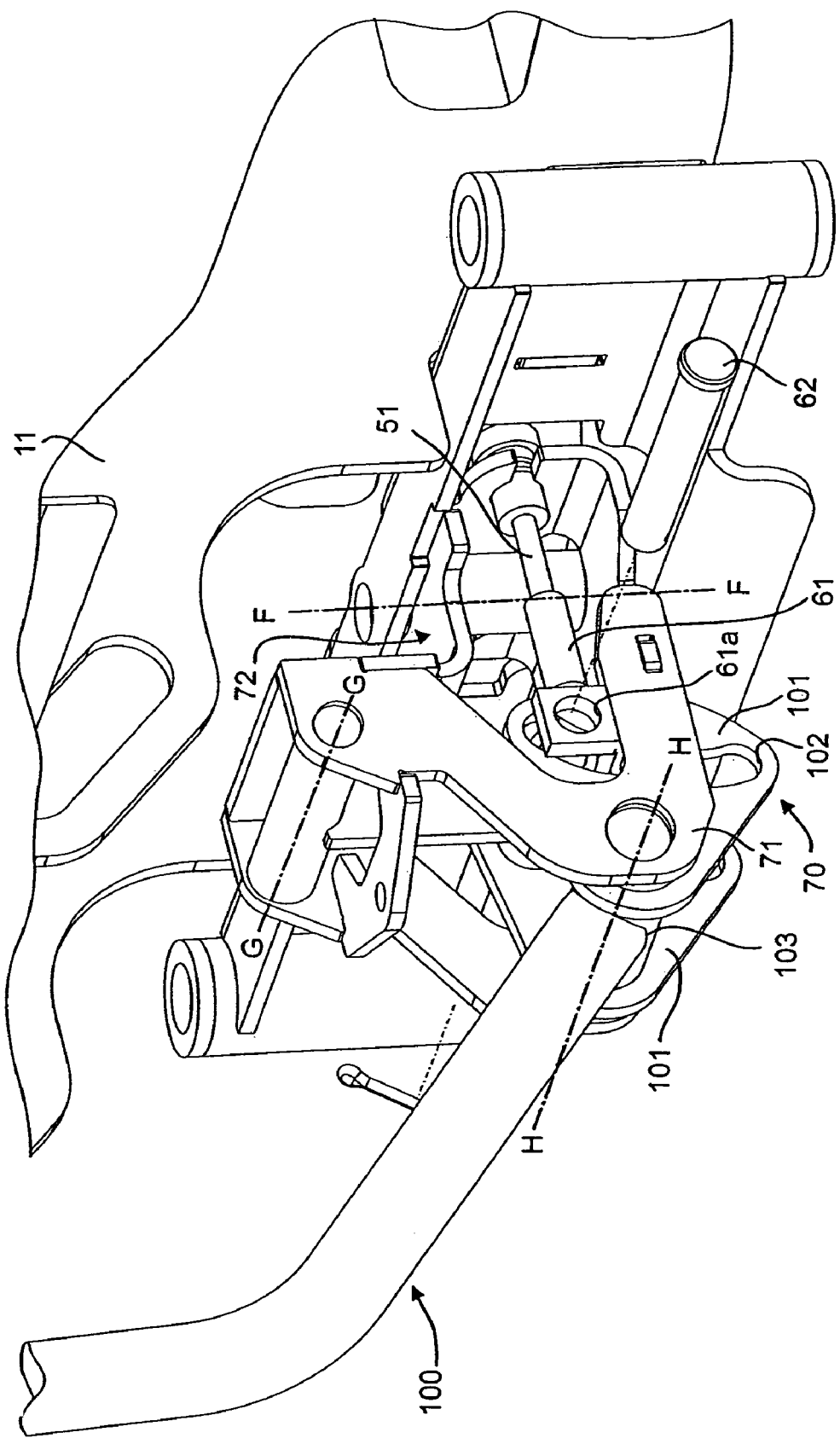
FIG. 7 is an enlarged, fragmentary, perspective view of the handle swivel assembly of FIG. 5 illustrated in an assembled condition.

Referring to FIGS. 5 to 7, there is illustrated a tire 122 mounted on a front wheel rim 125 that is coupled to a front wheel hub 121 having a plurality of outwardly extending wheel studs 126. The wheel hub 121 is rotatably coupled to a spindle 120 having an outwardly extending radial axle 120a transversely disposed relative to the trailer 10 and integrally coupled to a base portion 120. While only one front wheel assembly has been described and illustrated in the figures, it will be appreciated that a transversely opposing wheel assembly has substantially the same configuration.

A handle 100 is coupled to a handle swivel assembly 70 that is pivotally disposed on the front end of the trailer 10 to control brake application of the above-described braking assembly 30 and effectuate steering of the trailer 10. The base portion 120 includes an inwardly extending upper flange having a substantially vertically aligned bearing 120c defining a vertically oriented axis E.

A front frame support 124 is fixedly coupled to the frame 11b. The support 124 includes a substantially horizontally disposed channelway 124a defined by two spaced apart, horizontally disposed sidewalls and terminating at each end in a substantially vertically aligned bearing 124b having a vertical axis E. Upon assembly, the bearing aperture 120c of the base portion of the spindle 120 is coupled to a respective bearing 124b in substantial vertical axial alignment by a pivot pin 120d so that each spindle 120 can pivot about vertical axis E relative to the support 124 to effectuate steering of the trailer 10 by directional manipulation of the tires 122. Coordinated pivotal movement of the spindles 120 is controlled by tie rods 127 operably coupled to the handle swivel assembly 70.

Figure 8:
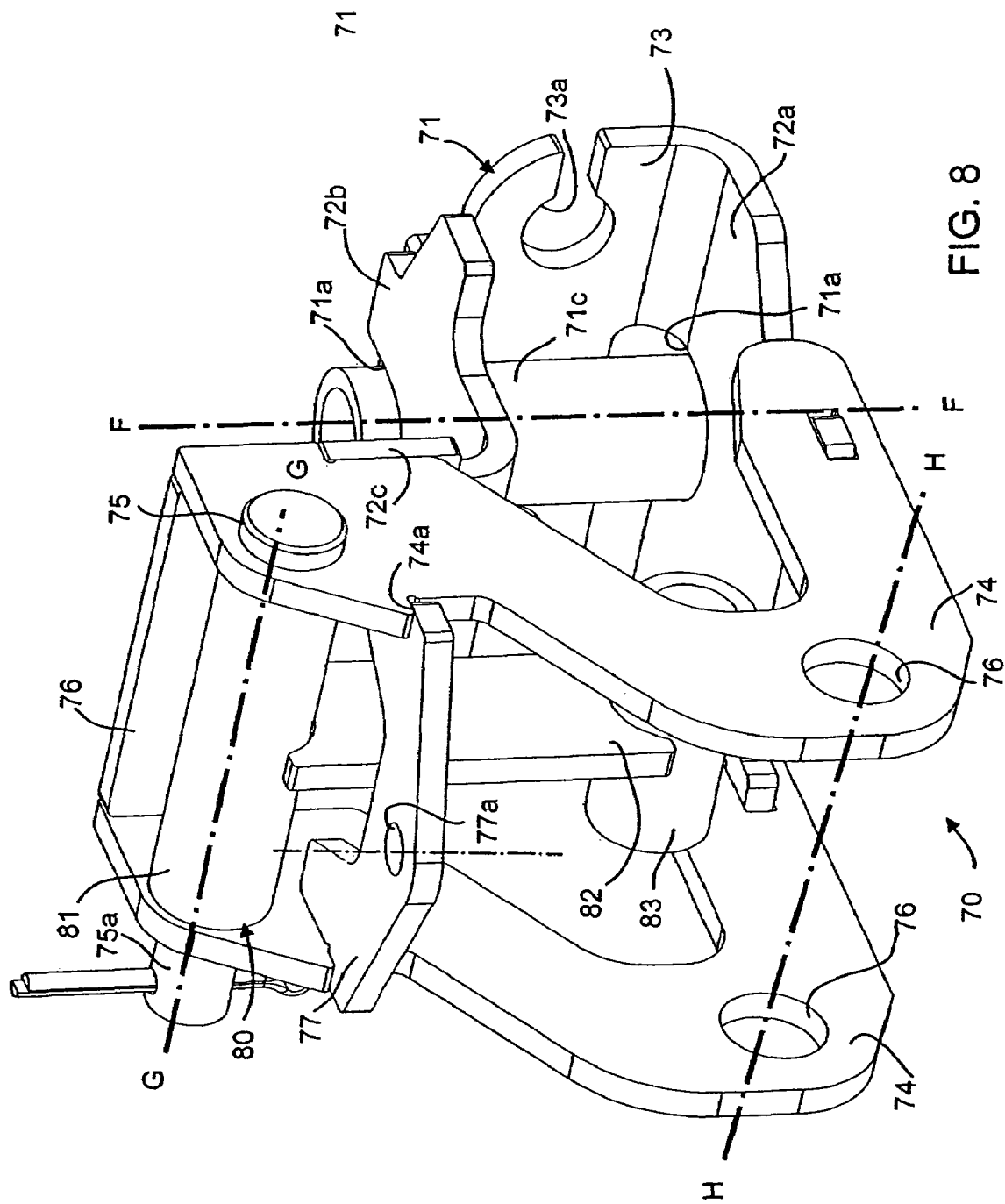
FIG. 8 is an enlarged, perspective view of a portion of the handle swivel assembly of FIG. 7.
Figure 9:
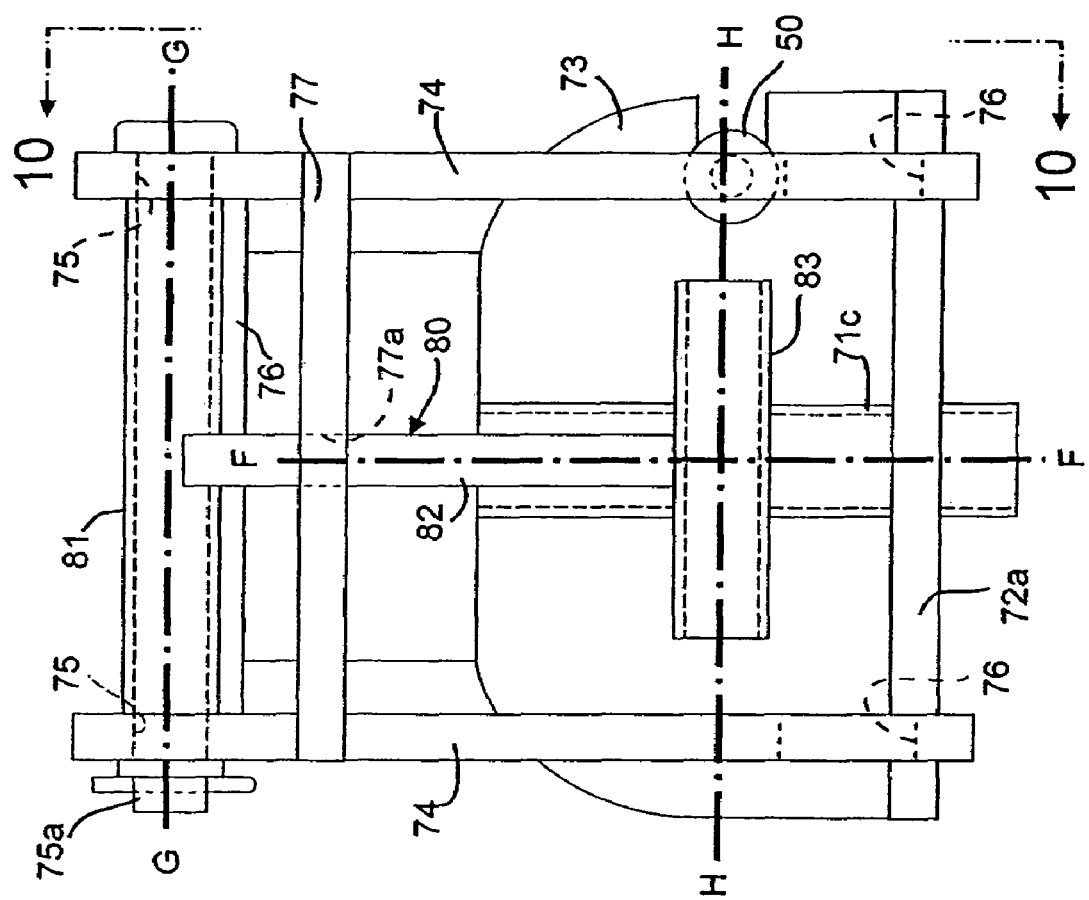
FIG. 9 is a front, elevational view of the portion of FIG. 8.
Figure 10:
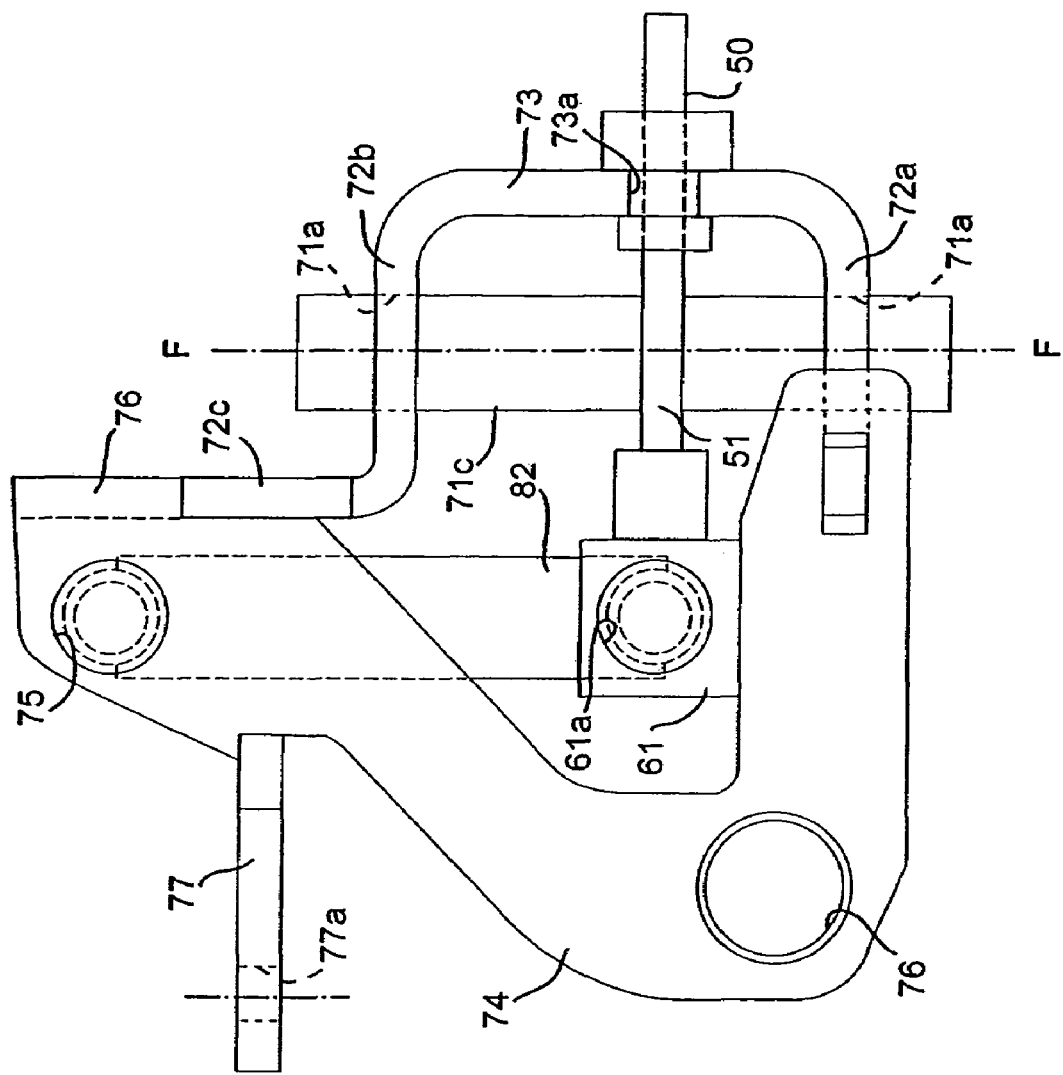
FIG. 10 is a side elevation view of the portion of FIG. 9 taken along line 10-10 therein.

Referring also to FIGS. 8-10, the handle swivel assembly 70 is adapted to be pivotally coupled to the approximate center of the channelway 124a, thus being pivotal about vertical axis F. The handle swivel assembly 70 includes a rearwardly disposed support base 71 with substantially centrally disposed apertures 71a in vertical axial alignment relative to each other with a vertically oriented bearing support 71c disposed in axial alignment therewith which is adapted to receive a pin 71b, thereby facilitating pivotal movement of the handle swivel assembly 70 about vertical axis F when the assembly 70 is pivotally coupled to the channelway 124a. The channelway 124a may include a recess or aperture for receiving at least a portion of the support base 71 when the handle swivel assembly 70 is pivotally coupled to the front support frame 124. The rear support base 71 may have lower and upper horizontal plates 72a, 72b vertically spaced apart by an integrally depending and rearwardly disposed vertical plate 73, thereby defining a substantially "U" shaped configuration. The upper horizontal plate 72b may include a forwardly disposed, upwardly extending back plate 72c. The vertical plate 73 includes a cable support aperture 73a disposed adjacent to at least one edge thereof for receiving and supporting the cable 51.

The handle swivel assembly 70 further includes at least two vertically oriented side plates 74, each side plate 74 including a pivot link pivot aperture 75 disposed adjacent to the upper end of the side plate 74 and a handle pivot aperture 76 forwardly disposed adjacent to the lower end of the side plate 74. The side plates 74 are spaced apart relative to each other and are coupled together with a vertically disposed rear support plate 76 integrally coupled to the upper end of each respective side plate 74 adjacent to the rear of the side plates, and a horizontally disposed front support plate 77 integrally coupled to each respective side plate 74 adjacent to the front of the side plates 74 whereby the front support plate 77 extends outwardly from the side plates 74. Each side plate 74 may include a forwardly disposed notched portion 74a for receiving the front support plate 77. The front support plate 77 includes a substantially centrally disposed aperture 77a for pivotal engagement with the tie rods 127.

The backside of each side plate 74 is integrally coupled to the rear support base 71 by the upwardly extending back plate 72c adjacent to the upper portions of the side plates 74, and by the terminal ends of the lower horizontal plate 72b adjacent to the lower portion of the side plate 74. The upwardly extending back plate 72c may be disposed beneath the rear support plate 76.

A pivot link 80 is disposed between both side plates 74 and includes a horizontally disposed upper bearing 81 transversely extending between the side plates 74 and being axially aligned with the pivot link pivot apertures 75 along axis G, and a depending integral swing arm 82 terminating with a horizontal, transversely disposed cam bearing 83. The pivot link 80 is pivotally coupled between the side plates 74 with a pin 75a extending from a pivot link pivot aperture 75 of one of the side plates 74, thru the upper bearing 81, and thru the pivot link pivot aperture 75 of the opposite side plate 74, wherein the pivot link 80 is thusly pivotal about axis G.

Referring to FIGS. 1, 5 and 7, a handle 100 includes an upper portion which may terminate with two outwardly extending handgrips 107 adapted for manual handling of the handle 100, thereby resembling a "T" shape. The handle includes a substantially elongated portion 100a with an approximately 45 degree bent portion 100b at its lower end. The bent portion 100b terminates with a horizontally oriented bearing 103 disposed between two opposing, longitudinally extending cam plates 101, each having a camming structure including a substantially arcuate cam follower path 102 disposed adjacent to its terminal ends. The cam follower path 102 may include a slight depression or bump 102a in the approximate middle of the path 102 acting as a retaining structure.

The handle 100 is pivotally connected between the side plates 74 of the handle swivel assembly 70 by disposing a pin 105 through the handle pivot aperture 76 of one of the side plates 74, through the handle bearing portion 103 and through the handle pivot aperture 76 of the opposite side plate 74, thereby allowing the handle 100 to pivot about axis C relative to the handle swivel assembly 70 between a substantially horizontal position (not shown) and a substantially vertical position (FIGS. 1 and 5). The handle 100 is thusly disposed and acts as a lever with a fulcrum defined by axis C. In its assembled condition, the handle 100 disposes the cam bearing 83 between the cam plates 101 wherein the follower paths 102 are in substantial horizontal axial alignment with the cam bearing 83.

The forward end of the brake control cable 50 is supported by the cable support aperture 73a wherein the cable housing 52 is fixedly secured relative to the handle swivel assembly 70, thus allowing the cable 51 to extend forwardly therefrom and slide relative to the cable housing 52. The terminus of the cable 51 includes a cable connector 61 having a vertically oriented portion with a substantially centrally disposed aperture 61a (FIG. 7). A camming pin 62 is disposed through the aperture 61a, the first cam follower path 102, the cam bearing 83 and the cam follower path 102 of the opposite cam plate 101, thereby operably coupling the cable 51 to the handle 100.

During operation, the brake pads 32 are biased to the braking condition by the biasing mechanism 40, thereby applying the brakes as described above. When the handle 100 is moved to either a first or second position, force within the cable 51 is relieved, caused by the location of the camming pin 62 within the cam follower path 102, wherein the operably coupled biasing mechanism 40 is unaffected thereby allowing the brake pads 32 to remain in the biased braking condition. When the handle 100 is moved from either of the first or second positions, the cam pin 62 is forced along the cam follower path 102 wherein the cable 51 is pulled forwardly by the arcuate cam path 102, causing the cable 51 to pull on the biasing mechanism 40, thereby causing the brake pads 31 to move to the non-braking condition to allow easy mobility of the trailer 10. In an embodiment, when the handle 100 is pivotally moved between the first and second positions, the braking assembly is moved to the non-braking condition. In another embodiment, the first position is a location where the handle is substantially vertical relative to the front end and the second position is a location where the handle is substantially horizontal relative to the front end.

The handle 100 can cause the cam pin 62 to be disposed adjacent to the depression or bump 102a, thereby retaining the relative position of the cam pin 62 while the cable 51 is pulled and to provide tactile response to the user of the deactivated state of the brakes. However, if the handle 100 is accidentally dropped, for example, where the handle 100 will be disposed generally horizontal relative to the handle swivel assembly 70, or the handle 100 is stowed in a substantially vertical position, the cam pin 62 again follows the cam follower path 102 and causes tension to be released within the cable 51, thereby activating the braking assembly 30.

Steering of the trailer 10 is effectuated by causing the handle swivel assembly 70 to pivot about axis F, thereby causing the tie rods 127, which are pivotally coupled to the aperture 77a of the front support plate 77, to pivot the spindles respectively about axis E, wherein the front tires 122 are directed to a desired position.

Figure 11:
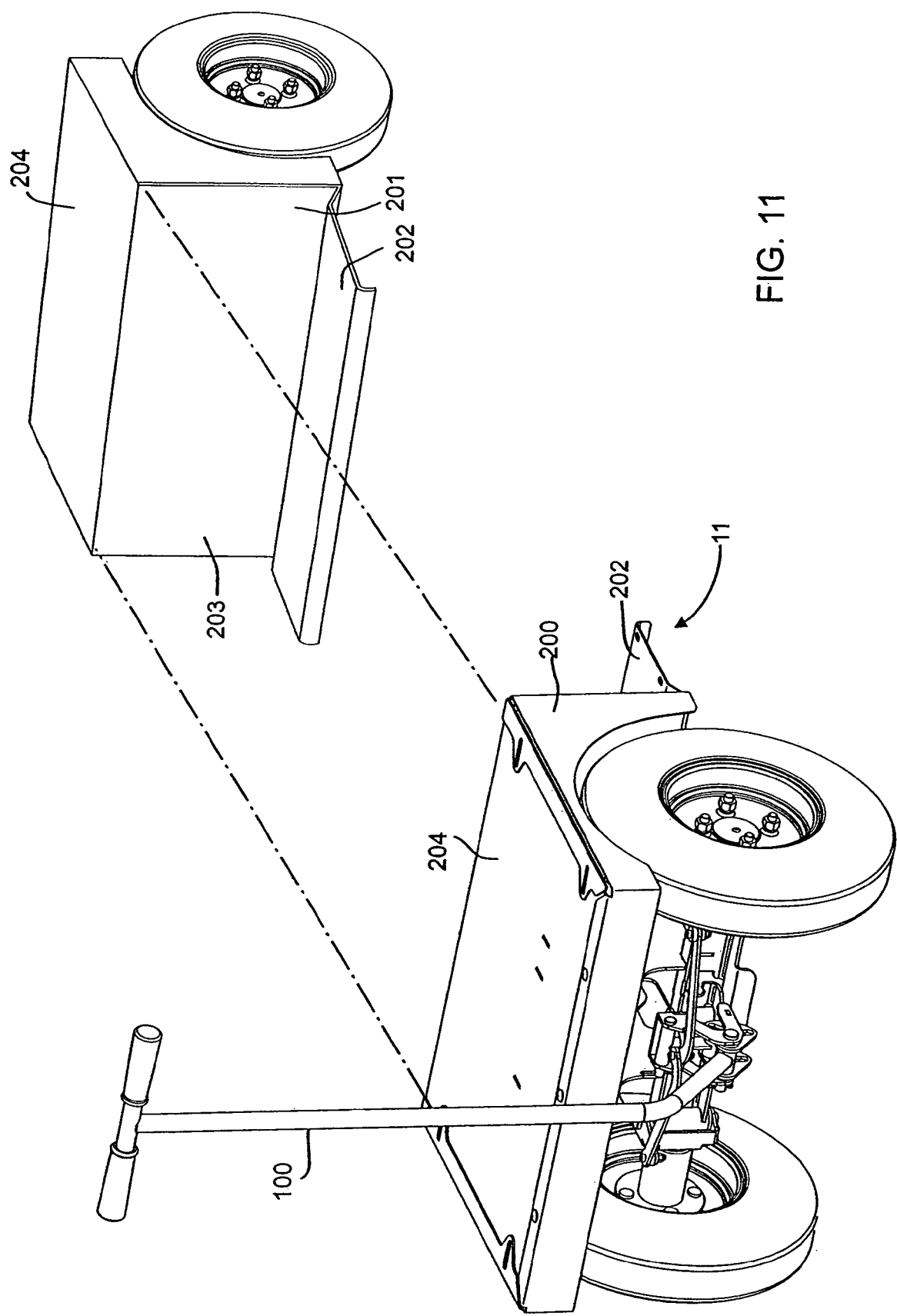
FIG. 11 is a front perspective view of a pair of frame assemblies of the present application disposed in spaced relation to each other.

Referring again to FIGS. 1A, 5, and 11, the frame 11 may include a pair of frame elements 200, 201, each frame element 200, 201 being independent from each other. Each frame element may respectively include horizontally oriented upper and lower support bases 202, 204 vertically spaced and axially offset relative to each other. The upper and lower support bases 202, 204 are integrally coupled to each other with an upstanding vertical wall 203. In such a configuration, when the frame elements 200, 201 are horizontally spaced relative to each other, the lower support bases 204 of the respective frame elements 200, 201 are generally horizontally spaced relative to each other in mirror image relation to define a trailer support platform therebetween. Accordingly, a trailer 10 may be secured on top of the respective lower support bases 204 and between the upstanding walls 203. The respective upper support bases 202 may be used to support a tool cabinet, a decorative fender 12, 15a or the like. Such a configuration allows quick adaptability to trailers of varying sizes in that the front and rear frame elements 200, 201 can be variably spaced depending upon the size of the trailer, thereby manipulating the horizontal distance between the lower support bases 204. Such a configuration further has the benefit of ease of manufacturing in that both the pair of frame elements 200, 201, are substantially identical to each other and thus can be created with substantially identical manufacturing processes.

Each frame element 200, 201 may further include a pair of depending, parallel sidewalls 13 that supports a transversely oriented axle adapted for operable coupling to transversely opposing wheels. Each sidewall 13 may include a tie down aperture 13a adapted for securing items to the trailer 10 in a well known manner. The tie down aperture 13a may be oblong shaped and disposed at an inclined angle relative to the tool storage trailer 10.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

We claim:

1. A handle swivel assembly for a vehicle having a frame and a plurality of wheels comprising:
   a rear support base having a vertically oriented bearing support;
   a pivot pin disposed through the bearing support and pivotally coupled to the frame with a support structure thereby facilitating pivotal movement of the rear support base about a vertical axis relative to a front end of the rear support base;
   a first vertically oriented side plate coupled to the support base and having a first pivot link aperture disposed adjacent to an upper end thereof and a first handle pivot aperture forwardly disposed adjacent to a lower end thereof; and
   a generally horizontally oriented front support plate coupled to the side plate adjacent to the upper end thereof and having a substantially centrally disposed tie rod aperture for pivotal engagement with a tie rod that is operably coupled to a wheel for directional manipulation thereof.

2. The handle swivel assembly as claimed in claim 1 wherein the rear support base includes upper and lower horizontal plates vertically spaced relative to each other and integrally coupled to an upstanding wall disposed rearwardly relative to the side plate, each horizontal plate having a centrally disposed aperture in substantial vertical axial alignment relative to each other for receiving the bearing support.

3. The handle swivel assembly as claimed in claim 2 wherein the first side plate is coupled to the upper and lower horizontal plates.

4. The handle swivel assembly as claimed in claim 3 further comprising a second vertically oriented side plate coupled to the support base in transversely opposing relation to the first side plate and having a second pivot link aperture disposed adjacent to an upper end thereof in substantial horizontal axial alignment with the first pivot link aperture and a second handle pivot aperture forwardly disposed adjacent to a lower end thereof in substantial horizontal axial alignment with the first handle pivot aperture.

5. The handle swivel assembly as claimed in claim 4 wherein the front support plate is disposed between the first and second side plates thereby aligning the tie rod aperture in substantial equidistant relation to the first and second side plates.

6. The handle swivel assembly as claimed in claim 1 wherein the support structure includes a frame support fixedly secured to the frame and having a substantially horizontal channelway defined by two spaced apart, horizontally aligned sidewalls terminating on each end with a substantially vertically aligned frame bearing.

7. The handle swivel assembly as claimed in claim 6 wherein each sidewall includes a base pivot aperture disposed in substantial equidistant relation to the bearings and in substantial vertical axial alignment with each other.

8. The handle swivel assembly as claimed in claim 7 wherein the pivot pin is disposed through the pivot apertures and the bearing support thereby pivotally coupling the support base to the support structure.

9. The handle swivel assembly as claimed in claim 8 further comprising a wheel support having a generally outwardly extending spindle for operable engagement with a wheel and coupled to a base portion having inwardly extending upper and lower flanges, each flange having a flange bearing aperture in substantial vertical alignment relative to each other.

10. The handle swivel assembly as claimed in claim 9 wherein the upper flange includes a forwardly disposed tie rod support aperture for operably coupling the wheel support to the front support plate with the tie rod.

11. The handle swivel assembly as claimed in claim 10 wherein the wheel support is pivotally coupled to the support structure by disposing a pivot pin through the flange bearing apertures and the frame bearing.

12. The handle swivel assembly as claimed in claim 4 further comprising a pivot link having a horizontally aligned pivot link bearing disposed between the first and second side plates in substantial horizontal axial alignment with the first and second pivot link apertures.

13. The handle swivel assembly as claimed in claim 12 wherein the pivot link is pivotally coupled to the first and second side plates with a pivot link pin disposed through the first and second pivot link apertures and the pivot link bearing.

14. The handle swivel assembly as claimed in claim 13 wherein the pivot link includes a depending integral swing arm terminating with a substantially horizontal, transversely disposed cam bearing.

15. The handle swivel assembly as claimed in claim 14 further comprising a handle having a substantially elongated portion terminating with a horizontally oriented handle bearing disposed between two opposing, longitudinally extending cam plates, each cam plate having a cam structure disposed adjacent to an edge thereof.

16. The handle swivel assembly as claimed in claim 15 wherein the cam structure includes a substantially arcuate cam follower path with a retaining structure disposed in the approximate middle of the path.

17. The handle swivel assembly as claimed in claim 16 wherein the handle bearing is disposed between the first and second plates in substantial horizontal axial alignment with the first and second handle pivot apertures.

18. The handle swivel assembly as claimed in claim 17 wherein the handle is pivotally coupled to the first and second support plates with a handle pivot pin disposed through the first and second handle pivot apertures and the handle bearing.

19. The handle swivel assembly as claimed in claim 18 further comprising a brake control cable operably coupling the handle to a braking assembly that is operably coupled with a wheel and having a first terminal end with a cable connector having a vertically resisted portion with a centrally disposed cam pin aperture, the cable being coupled to the cam plate with a cam pin disposed through the cam pin aperture and the cam structure, wherein pivoting the handle about a horizontal axis from either a first position or second position causes a forwardly directed force in the cable to actuate the braking assembly to a non-braking condition.

\* \* \* \* \*